United States Patent
Yoshiguchi et al.

(10) Patent No.: US 7,751,958 B2
(45) Date of Patent: Jul. 6, 2010

(54) WHITE-LINE DISPLAY APPARATUS FOR A VEHICLE

(75) Inventors: Takuya Yoshiguchi, Tokyo (JP); Takashi Ono, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 832 days.

(21) Appl. No.: 11/590,932

(22) Filed: Nov. 1, 2006

(65) Prior Publication Data

US 2007/0106471 A1 May 10, 2007

(30) Foreign Application Priority Data

Nov. 2, 2005 (JP) .............................. 2005-319662

(51) Int. Cl.
*B60R 21/00* (2006.01)
(52) U.S. Cl. .......................... 701/36; 701/300; 340/438
(58) Field of Classification Search .................. None
See application file for complete search history.

(56) References Cited

U.S. PATENT DOCUMENTS

| | | | | |
|---|---|---|---|---|
| 7,433,769 | B2* | 10/2008 | Tange et al. ................... | 701/41 |
| 7,454,291 | B2* | 11/2008 | Kawakami et al. ........... | 701/301 |
| 2003/0026456 | A1* | 2/2003 | Akutagawa .................. | 382/104 |
| 2006/0287826 | A1* | 12/2006 | Shimizu et al. .............. | 701/216 |

FOREIGN PATENT DOCUMENTS

| | | |
|---|---|---|
| DE | 10 2004 005 815 B3 | 6/2005 |
| EP | 0 527 665 B1 | 8/1995 |
| JP | 11-126300 | 5/1999 |
| JP | 2003 104146 | 9/2003 |
| WO | WO 2004/088611 A1 | 10/2004 |

\* cited by examiner

*Primary Examiner*—Michael J. Zanelli
(74) *Attorney, Agent, or Firm*—Jacobson Holman PLLC (57) ABSTRACT

A vehicular display apparatus enables a driver to easily grasp a recognizing state of a white line and can prevent one from misjudging the recognizing state. The vehicular display apparatus has a white-line recognizing unit for recognizing a white line on a road surface on which a vehicle runs, and a display unit for displaying the white line on a screen based on a recognition result of the white-line recognizing unit. When the white-line recognizing unit recognizes the white line, the display unit displays the white line as a solid filled figure, and when the white-line recognizing unit does not recognize the white line, the display unit displays the white line as an outline figure.

10 Claims, 4 Drawing Sheets

WHITE-LINE DISPLAY APPARATUS FOR A VEHICLE

BACKGROUND OF THE INVENTION (1) Field of the Invention

The present invention relates to a white-line display apparatus for a vehicle which recognizes a white line on a road surface, and displays the recognized white line on a screen.

(2) Description of Related Art

In recent years, a technique as disclosed in Japanese Patent Application Laid-open No. 2003-104146 has become widespread. According to this technique, a positional relation between an own vehicle and a white line on a road surface on which the own vehicle run is detected using a detector such as a CCD camera, and when there are fears that the own vehicle may go out from the lane (including a region between white lines on both sides of the own vehicle), a warning of deviation from the lane is given to a driver by means of display on a screen or a sound.

In Japanese Patent Application Laid-open No. 2003-104146, there is described an apparatus in which when there are fears that the own vehicle may deviate from the lane, the apparatus gives a warning of deviation from a lane on a warning display provided on an instrument panel in front of a driver's seat.

Figure 4:
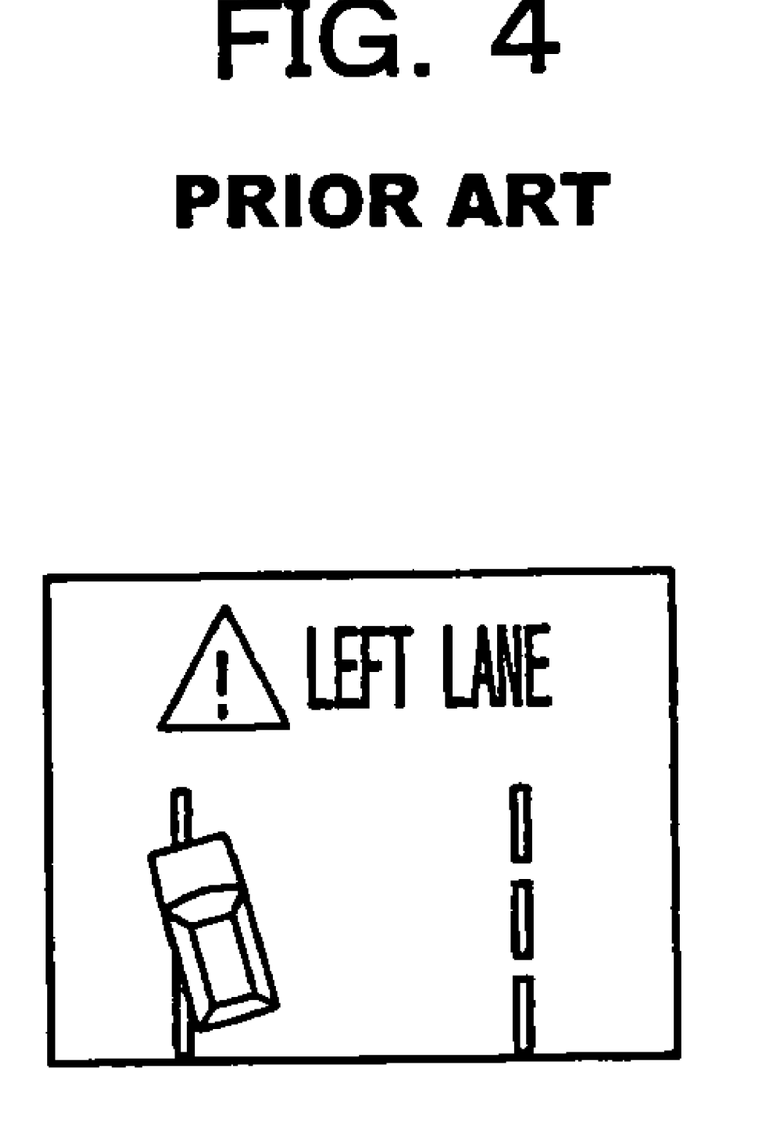
FIG. 4 is a diagram showing display contents of a display screen showing deviation of a vehicle in a conventional technique.

In this apparatus, a white line is shown always at a determined position in the display screen. An image of the own vehicle is shown between both the displayed white lines. When the own vehicle deviates from the lane, as shown in FIG. 4, a display position of the own vehicle image is deviated to a position intersecting with the white line, and a deviating state of the own vehicle from the lane is shown.

According to the conventional warning display screen, however, even when the own vehicle is likely to be deviated from the lane, the white lines are always displayed at the determined positions on the left and right sides of the screen; therefore, there is a large sensory difference with respect to the actual visual image of the driver. That is, the warning display screen in the conventional display apparatus can not be said as being a display screen with which the driver can instinctively understand a deviated state of the own vehicle from a lane.

The present invention has been accomplished in view of such a circumstance, and it is an object of the invention to provide a vehicular display apparatus in which a driver can instinctively understand a deviated state of his or her own vehicle from a lane.

SUMMARY OF THE INVENTION

To achieve the above object, the present invention provides a white-line display apparatus for a vehicle comprising white-line recognizing means for recognizing white lines on left and right sides of on a road surface on which a vehicle runs, lane-deviation determining means for determining whether or not the vehicle deviates, or is likely to deviate from a lane defined by the white lines, based on at least a relative position between the vehicle and the white line recognized by the white-line recognizing means; display means for displaying white lines on left and right sides in a screen based on a recognition result by the white-line recognizing means; and white line display changing means for changing display of a white line by the display means based on a determination result of the lane-deviation determining means.

According to the white-line display apparatus for a vehicle of the invention, since the white line display changing means changes the display of the white line based on the determination result of the lane-deviation determining means, the driver can instinctively grasp the determination result of the lane deviation.

It is preferable that when the lane-deviation determining means has determined that the vehicle does not deviate, or is not likely to deviate, from the lane, the white-line-display changing means represents each of the left and right white lines displayed by the display means as a figure inclined by a predetermined angle toward the center of the screen with respect to the vertical axis at the top of the screen, and when the lane-deviation determining means has determined that the vehicle deviates or is likely to deviate from the lane, the white-line-display changing means represents the one of the left and right white lines violated by the vehicle as a figure inclined by an angle smaller than predetermined angle.

With this, when the vehicle does not deviate from the lane, both the left and right white lines are inclined by predetermined angles and displayed, and when the vehicle deviates from the lane, the inclination angle of one of the white lines which the vehicle violates is reduced and displayed. Thus, the driver is provided with perspective in the lateral direction on the screen, the screen is closer to the actual scenery from the viewpoint of the driver, and the driver can instinctively understand the deviation state of the vehicle.

It is preferable that when the lane-deviation determining means determines that the vehicle deviates or is likely to deviate from the lane, the white-line-display changing means represents the other of the left and right white lines as a figure inclined by an angle larger than the predetermined angle.

With this, when the vehicle deviates from the lane, the inclination angle of one of the white lines from which the vehicle does not deviate is increased, the driver is provided with perspective in the lateral direction on the screen, the screen is closer to the actual scenery from the viewpoint of the driver, and the driver can instinctively understand the deviation state of the vehicle.

It is preferable that when the lane-deviation determining means determines that the vehicle deviates or is likely to deviate from the lane, the white-line-display changing means represents the one of the left and right white lines violated by the vehicle as a thickened figure.

With this, when the vehicle deviates from the lane, the one of the white lines from which the vehicle does not deviate is thickened, the driver is provided with perspective in the lateral direction on the screen, the screen is closer to the actual scenery from the view point of the driver, and the driver can instinctively understand the deviation state of the vehicle.

It is preferable that when the lane-deviation determining means determines that the vehicle deviates or is likely to deviate from the lane, the white-line-display changing means represents the other of the left and right white lines as a thinned figure.

With this, when the vehicle deviates from the lane, the one of the white lines from which the vehicle does not deviate is thinned, the driver is provided with perspective in the lateral direction on the screen, the screen is closer to the actual scenery from the view point of the driver, and the driver can instinctively understand the deviation state of the vehicle.

It is preferable that when the lane-deviation determining means has determined that the vehicle does not deviate, or is likely to deviate from the lane, the white-line-display changing means represents each of the left and right white lines as a white figure, and when the lane-deviation determining means determines that the vehicle deviates or is likely to deviate from the lane, the white-line-display changing means represents the one of the left and right white lines violated by the vehicle as a colored figure.

With this, both the right and left sides white lines are displayed as a white figure during the normal running, and when the vehicle deviates from the lane, only one of the left and right white lines to be displayed which the vehicle violates is as a colored figure, and the driver can instinctively grasp the deviation state and the deviation direction of the vehicle from the difference of the display colors of the white lines at the normal time and the deviation state.

It is preferable that when the lane-deviation determining means has determined that the vehicle has deviated, or is likely to deviate from the lane, the white-line-display changing means represents the other of the left and right white lines as a figure whose lower end is lifted.

With this, when the vehicle deviates from the lane, the lower end position of one of the white lines from which the vehicle does not deviate is shifted upward and displayed, the driver is provided with perspective in the lateral direction on the screen, the screen is closer to the actual scenery from the view point of the driver, and the driver can instinctively understand the deviation state of the vehicle.

It is preferable that when the lane-deviation determining means has determined that the vehicle deviates or is likely to deviate from the lane, the white-line-display changing means represents the other of the left and right white lines, which is violated by the vehicle, as a figure whose lower end is lowered from which the vehicle deviates.

With this, when the vehicle deviates from the lane, the lower end position of one of the white lines which the vehicle violates is shifted downward and displayed, the driver is provided with perspective in the lateral direction on the screen, the screen is closer to the actual scenery from the view point of the driver, and the driver can instinctively understand the deviation state of the vehicle.

It is preferable that when the display means represents the white line as a solid filled figure when the white-line recognizing means recognize the white line and as an outline figure when the white-line recognizing means does not recognize the white line.

With this, when the white-line recognizing means recognizes the white line, the display means displays the white lines in a solid filled-in manner, and when the white-line recognizing means does not recognize the white line, the display means displays the white lines in a hollow manner. Therefore, the driver can easily grasp whether the white-line recognizing means recognizes the white line. When the own vehicle is running on a road surface where no white line exists, the white line on the screen is displayed in the hollow manner; therefore, the driver does not feel a sense of discomfort which may be caused due to the difference between the display on the screen and the actual road surface state.

It is preferable that when the display means shows the contours of the outline figure by a dotted line.

With this, when the display means displays the white line in the hollow manner, a contour line of the white line is displayed with a dotted line. Therefore, the driver can instinctively grasp whether the white-line recognizing means recognizes the white line.

DESCRIPTION OF THE PREFERRED EMBODIMENTS

Embodiments of the present invention will be explained with reference to the drawings below.

Figure 1A:
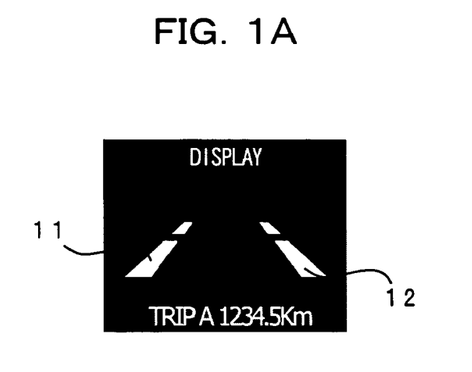
FIGS. 1A to 1F are diagrams used for explaining a vehicular display apparatus according to an embodiment of the present invention, and show display contents shown on a display in correspondence with a recognition state of a white line and a deviation state of a vehicle.
Figure 1B:
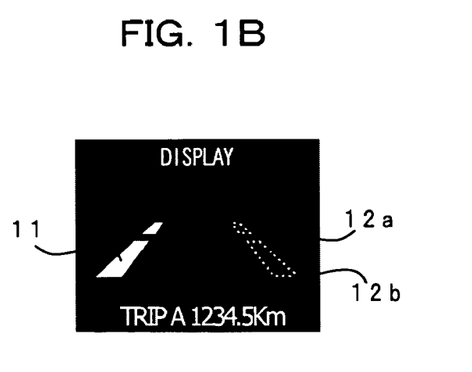
Figure 1C:
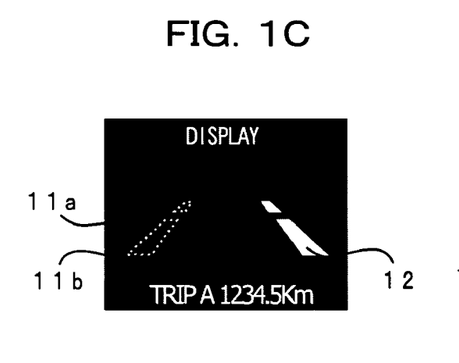
Figure 1D:
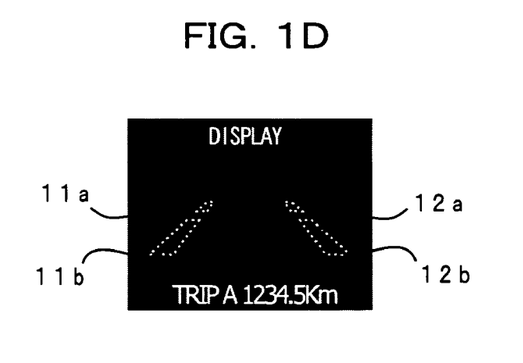
Figure 1E:
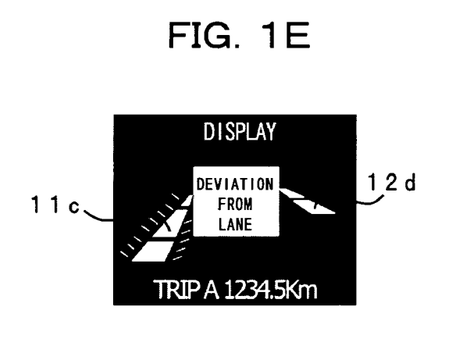
Figure 1F:
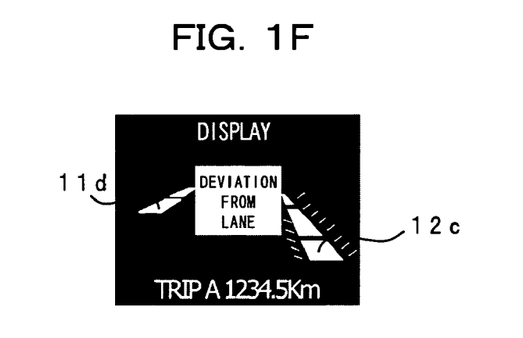
Figure 2:
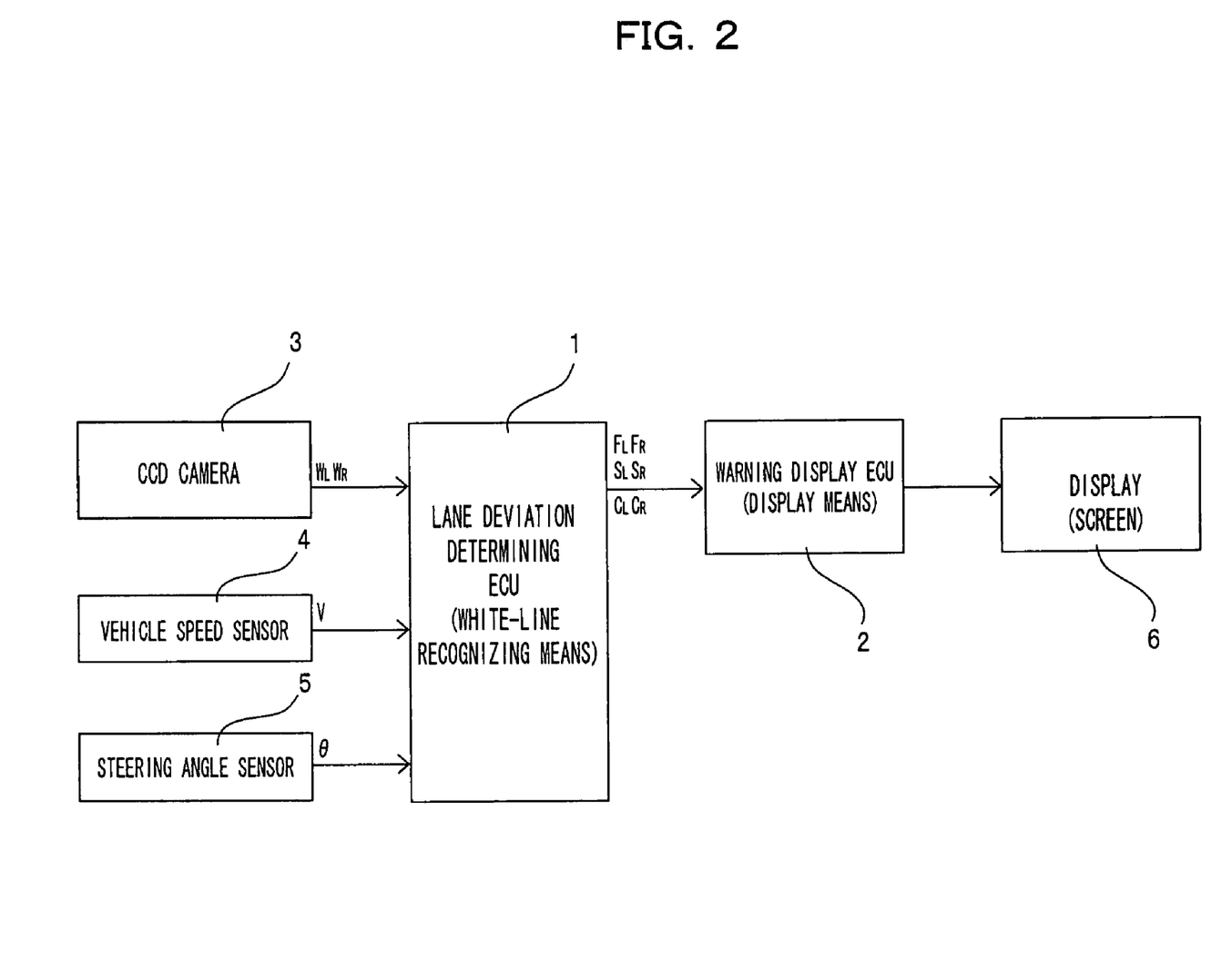
FIG. 2 is a block diagram showing the entire structure of a lane deviation warning apparatus of a vehicle constituted by applying the vehicular display apparatus of the embodiment of the invention.
Figure 3:
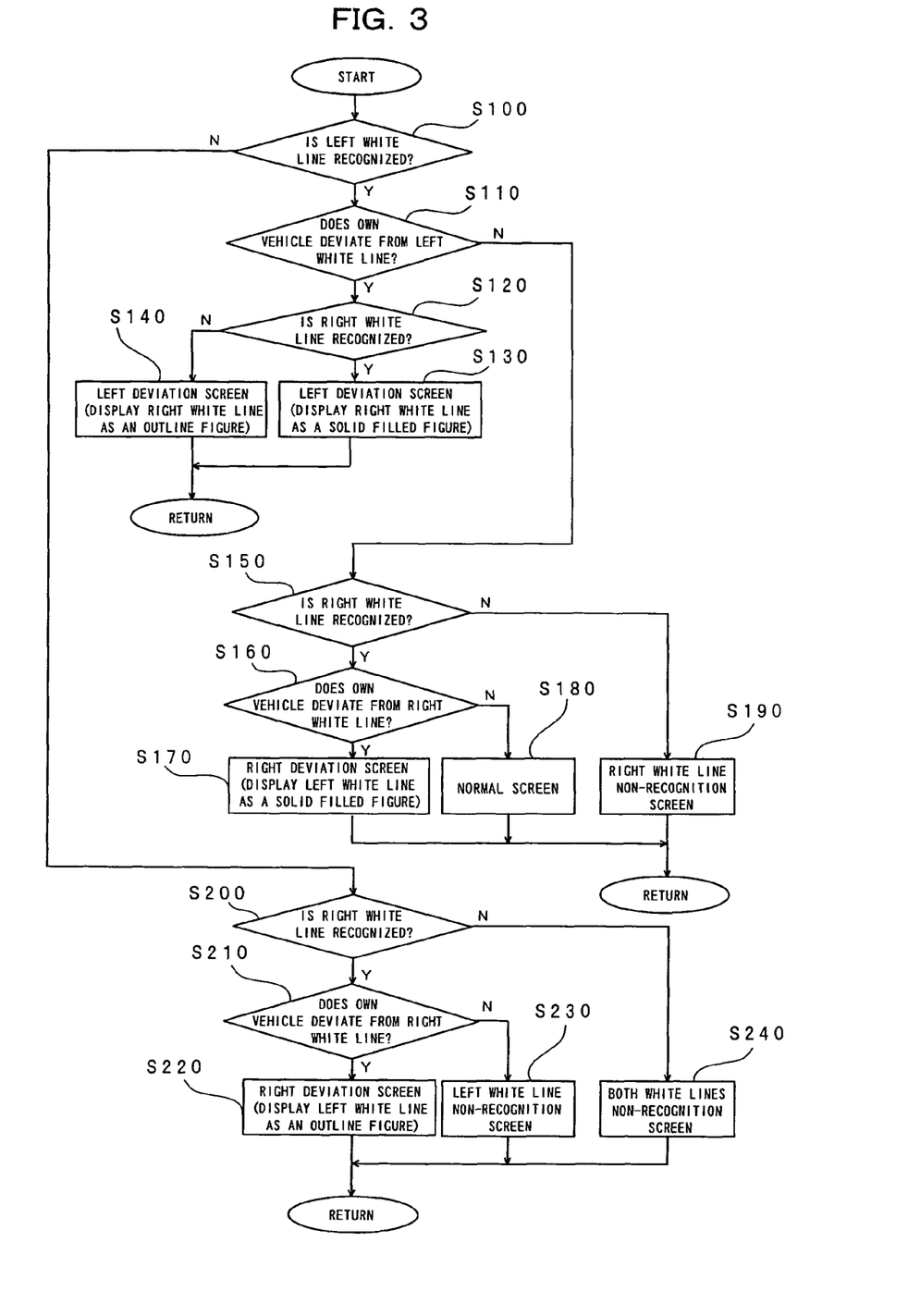
FIG. 3 is a flowchart showing a selection condition of a displayed image in a warning display ECU according to the embodiment of the invention.

FIGS. 1 to 3 are used for explaining a vehicular white-line display apparatus according to an embodiment of the present invention. FIGS. 1A to 1F are diagram showing a screen display in correspondence with a recognition state of a white line and a deviation state of an own vehicle. FIG. 2 is a block diagram showing the entire structure of a lane deviation warning apparatus of a vehicle constituted by applying the vehicular display apparatus of the embodiment of the invention. FIG. 3 is a flowchart showing a selection condition of a displayed image in accordance with a recognition state of a white line and a deviation state of the own vehicle.

As shown in FIG. 2, a vehicle deviation warning apparatus in the embodiment includes a lane deviation determining ECU (having functions as white-line recognizing means and lane-deviation determining means) 1 comprising memories (ROM and RAM) and CPU and the like, a warning display ECU (having functions as display means and white line display changing means), a CCD camera 3, a vehicle speed sensor 4, a steering angle sensor 5 and a display 6.

The CCD cameras 3 are provided on both right and left sides of an own vehicle as white line detectors which detect white lines on a road surface. The vehicle speed sensor 4 detects a vehicle speed of the own vehicle. The steering angle sensor 5 detects a steering angle of the own vehicle. The display 6 is disposed in an instrument panel (not shown) in front of a driver's seat so that a driver can easily see. The display 6 can display an image in accordance with an input image signal. It is not always necessary that the display 6 is provided in the instrument panel.

The CCD camera 3, the vehicle speed sensor 4 and the steering angle sensor 5 are connected to an input side of the lane deviation determining ECU 1. An output side of the ECU 1 is connected to an input side of the warning display ECU 2. An output side of the warning display ECU 2 is connected to the display 6.

The lane deviation determining ECU 1 analyzes, for example, brightness distribution of picked up images based on picked up image signals WL and WR of a road surface on both right and left sides of a vehicle which are input from the CCD cameras 3 provided on both the left and right sides of the vehicle, and individually recognizes the left and right side white lines of the vehicle (white-line recognizing means).

When the lane deviation determining ECU 1 recognizes white lines on both the right and left sides, the lane deviation determining ECU 1 inputs white line recognition signals SL and SR to the warning display ECU 2, and when the lane deviation determining ECU 1 can not recognize the white lines, the lane deviation determining ECU 1 inputs white line non-recognition signals FL and FR to the warning display ECU 2.

When the lane deviation determining ECU 1 recognizes white lines, the lane deviation determining ECU 1 obtains a positional relation (distance between the white line and the own vehicle) of the own vehicle with respect to the white lines, and determines (simply deviation determination, hereinafter) whether there is a fear that the own vehicle runs beyond the white line and deviates from the lane based on a vehicle speed signal V and a steering angle signal θ which are respectively input from the vehicle speed sensor 4 and the steering angle sensor 5 (lane-deviation determining means). The lane deviation determining ECU 1 inputs, to the warning display ECU 2, one of lane deviation signals CL and CR which corresponds to a white line from which the own vehicle may be deviated.

The deviation determination in the lane deviation determining ECU 1 can be made while taking various conditions such as a driving state of the vehicle and a circumferential state into consideration, but the deviation determination can be made more simply as follows.

First, an approaching speed (i.e., speed component of the vehicle in the lateral direction) with respect to a white line of the own vehicle is calculated from the steering angle signal θ and the vehicle speed signal V, and time t at which the own vehicle reaches the white line when the own vehicle runs at the current vehicle speed and steering angle is calculated from the calculated approaching speed and the positional relation of the own vehicle with respect to the white line. If the time t is smaller than a preset predetermined time t0, it is possible to determine that the possibility of the deviation of the own vehicle is high.

When the lane deviation determining ECU 1 can not recognize the white line, the deviation determination in a direction where the white line can not be recognized is not made naturally. For example, when only the left white line of the own vehicle is recognized, the deviation determination of only left side is made, and when only the right white line of the own vehicle is recognized, deviation determination of only right side is made.

The warning display ECU 2 controls the display contents of the display 6 in a switching manner so as to display appropriate display contents on the screen in accordance with a signal indicative of a recognition state of the input white line and a determination result signal of the deviation determination. Contents of the display screen which is shown on the display 6 in correspondence with an input state of these signals which are input to the warning display ECU 2 will be explained.

First, a display screen of a normal state where the own vehicle is not deviated from a lane or a possibility of such deviation is not high (i.e., none of the right and left lane deviation signals CL and CR is not input to the warning display ECU 2) will be explained. There are the following four display screens in the normal state.

Firstly, when the lane deviation determining ECU 1 recognizes white lines on both left and right sides of the vehicle, both the white line recognition signals SL and SR are input to the warning display ECU 2. In this case, the left white line 11 and the right white line 12 on the screen are represents as a solid filled figure in the display 6 (called normal screen) as shown in FIG. 1A. With this, a driver can instinctively recognize the white line.

Secondly, when the lane deviation determining ECU 1 does not recognize the right white line of the vehicle (recognizes only the left white line), the left white line recognition signal SL and the right white line non-recognition signal FR are input to the warning display ECU 2. At that time, as shown in FIG. 1B, the left white line 11 on the screen is shown on the display 6 as a solid filled figure, a contour line 12*a* of the right white line 12 shown as an outline figure is shown with a dotted line (called right white line non-recognition screen). With this, a driver can instinctively grasp that the right white line is not recognized. Further, even when a white line does not actually exists on the right side of the road surface on which the own vehicle runs, presence and absence of white lines on the actual road surface and on the display 6 match with each other; therefore, a driver does not a sense of discomfort.

Thirdly, on the other hand, when the lane deviation determining ECU 1 does not recognize a left white line of the vehicle (recognizes only the right white line), the right white line recognition signal SR and the left white line non-recognition signal FL are input to the warning display ECU 2. At that time, the right white line 12 on the screen is shown as a solid filled figure on the display 6 as shown in FIG. 1C, the contour line 11*a* of the left white line 11 shown as an outline figure is shown with a dotted line (called left white line non-recognition screen). With this, a driver can instinctively grasp that the left white line is not recognized. Further, even when a white line does not actually exist on the left side of the road surface on which the own vehicle runs, since presence and absence of white lines on the actual road surface and on the display 6 match with each other, a driver does not a sense of discomfort.

Fourthly, when the lane deviation determining ECU 1 does not recognize white lines on both sides of the vehicle, the left and right white line non-recognition signals FL and FR are input to the warning display ECU 2. At that time, the contour lines 11*a* and 12*a* of the left and right white lines 11 and 12 on the screen are displayed on the display 6 with dotted lines as shown in FIG. 1D, and the solid filled-in portions 11*b* and 12*b* are displayed in a hollow manner (called both white lines non-recognition screen). With this, a driver can instinctively grasp that the left and right white lines are not recognized. Further, even when a white line does not actually exists on the left side of the road surface on which the own vehicle runs, since presence and absence of white lines on the actual road surface and on the display 6 match with each other, a driver does not a sense of discomfort.

Here, the dotted line includes any lines except a continuous actual line, and includes a broken line and a phantom line. The dotted line may include a solid line comprising extremely thin lines. In any case, when the lane deviation determining ECU 1 can not recognize a white line, this fact should be displayed on the display 6 such that a driver can instinctively recognize that no white line can be recognized as compared with the solid filled-in display of the corresponding white line.

Next, a display screen of the display 6 when it is determined that the possibility that the own vehicle deviates in the deviation determination (in a state where any of the left and right lane deviation signals CL and CR is input to the warning display ECU 2) will be explained.

First, when the lane deviation determining ECU 1 determines that the possibility of the lane deviation of the own vehicle to the left is high, the left lane deviation signal CL is input to the warning display ECU 2. At that time, display contents (left deviation screen) shown in FIG. 1E is shown on the display 6, and this gives a warning of deviation of the own vehicle to the driver.

In this left deviation screen, the left white line 11*c* which is a white line which the own vehicle violates is changed in the following points (1) to (5) as compared with a left white line 11 in the normal screen.

(1) An inclination toward the center of the screen is shifted to a vertical side (e.g., angle formed with respect to the vertical axis becomes smaller).

(2) A display thickness of the white line is thickened.

(3) The white line is shown as a colored figure which draws attention of a driver such as yellow and orange as a solid filled figure.

(4) A lower end position is shifted downward of the screen.

(5) The length from an upper end position to a lower end position is increased.

On the other hand, the right white line 12d which is a white line where the own vehicle is not violated in the left deviation screen is changed in the following points (6) to (9) as compared with the right white line 12 in the normal screen.

(6) An inclination toward the center of the screen is shifted to a horizontal side (e.g., angle formed with respect to the vertical direction becomes greater).

(7) A display thickness of the white line is thinned.

(8) A lower end position is shifted upward of the screen.

(9) The length from an upper end position to a lower end position is shortened.

In the left deviation screen shown in FIG. 1E, since display of the left white line 11c and the right white line 12d are changed, the white lines on both the left and right sides displayed on the display 6 and the actual white lines which are visually seen by a driver when the own vehicle deviates leftward are visually close to each other. Therefore, the driver can sensuously recognize that the own vehicle deviates leftward from the display contents of the display 6. Further, since the white line from which the own vehicle deviates is shown with a warning color such as yellow and orange, the driver can recognize the leftward deviation of the own vehicle reliably. The right white line 12d on the left deviation screen at that time is shown as a solid filled figure like the right white line 12 in the normal screen.

FIG. 1E shows a display screen in a state where the lane deviation determining ECU 1 recognizes both the left and right white lines. After this, if the lane deviation determining ECU 1 does not recognize the right white line any more, the left lane deviation signal CL and the right white line non-recognition signal FR are input to the warning display ECU 2 from the lane deviation determining ECU 1, the right white line 12d is shown as an outline figure and the contour line of the outline figure is shown with a dotted line (not shown). Other indications (inclination, length, thickness, disposition and the like of the left and right white lines) are the same as those of the left deviation screen.

On the other hand, if it is determined that the possibility of rightward lane deviation of the own vehicle is high in the lane deviation determining ECU 1, the right lane deviation signal CR is input to the warning display ECU 2. At that time, display contents (called right deviation screen) as shown in FIG. 1F is shown on the display 6.

The right deviation screen has the same display contents as those of the left deviation screen except that the display of the corresponding white lines is laterally symmetric.

As explained above, the warning display ECU 2 obtains the recognition states of the white lines on both sides of the own vehicle and a result of the deviation determination, and appropriately switches and controls the screens to be shown on the display 6.

Next, details of the switching and control will be explained in accordance with the flowchart shown in FIG. 3. First, a signal (SL or FL) according to the recognition state of the left white line, a signal (SR or FR) according to the recognition state of the right white line, and a signal (CL, CR or no signal) according to the deviation determination are received. In step S100, it is determined whether the left white line is recognized. That is, when the left white line recognition signal SL is input to the warning display ECU 2, the procedure is advanced to step S110 through the YES route, and when the left white line non-recognition signal FL is input to the warning display ECU 2, the procedure is advanced to step S200 through the NO route.

In step S110, it is determined whether the lane deviation determining ECU 1 has determined that the own vehicle is likely to violate the left white line. That is, when the left lane deviation signal CL is input to the warning display ECU 2, the procedure is advanced to step S120 through the YES route, and when the left lane deviation signal CL is not input, the procedure is advanced to step S150 through the NO route.

In step S120, the warning display ECU 2 determines whether the right white line recognition signal SR is input and the right white line non-recognition signal FR is input. When the right white line recognition signal SR is input to the warning display ECU 2, in step S130, the warning display ECU 2 controls the display contents of the display 6 to display the left deviation screen. When the right white line non-recognition signal FR is input to the warning display ECU 2, in step S140, the warning display ECU 2 controls the display contents of the display 6 to display the right white line 12d as an outline figure.

As described above, in step S110, if the left lane deviation signal CL is not input to the warning display ECU 2, the procedure is advanced to step S150 through the NO route. Instep S150, it is determined whether the right white line recognition signal SR is input to the warning display ECU 2 and the right white line non-recognition signal FR is input to the warning display ECU 2. When the right white line recognition signal SR is input to the warning display ECU 2, the procedure is advanced to step S160 through the YES route, and when the right white line non-recognition signal FR is input to the warning display ECU 2, the procedure is advanced to step S190 through the NO route. In step S190, the warning display ECU 2 controls the display contents of the display 6 to display the right white line non-recognition screen.

In step S160, it is determined whether the right lane deviation signal CR is input to the warning display ECU 2. If the right lane deviation signal CR is input to the warning display ECU 2, in step S170, the warning display ECU 2 controls the display contents of the display 6 to display the right deviation screen. When the right lane deviation signal CR is not input to the warning display ECU 2, the warning display ECU 2 controls the display contents of the display 6 to display the normal screen.

As described above, if the procedure passes through the NO route in step S100, the procedure is advanced to step S200. Instep S200, it is determined whether the right white line recognition signal SR is input to the warning display ECU 2 and the right white line non-recognition signal FR is input to the warning display ECU 2. When the right white line recognition signal SR is input to the warning display ECU 2, the procedure is advanced to step S210 through the YES route, and if the right white line non-recognition signal FR is input to the warning display ECU 2, the procedure is advanced to step S240 through the NO route. In step S240, the warning display ECU 2 controls the display contents of the display 6 to display the both white lines non-recognition screen.

In step S210, it is determined whether the right lane deviation signal CR is input to the warning display ECU 2. If the right lane deviation signal CR is input to the warning display ECU 2, in step S220, the warning display ECU 2 controls the display contents of the display 6 to display the right white line 12d on the right deviation screen as an outline figure. When the right lane deviation signal CR is not input to the warning display ECU 2, in step S230, the warning display ECU 2 controls the display contents of the display 6 to display the left white line non-recognition screen.

Since the white-line display apparatus for a vehicle according to the embodiment of the present invention has the above-described structure, when the lane deviation determining ECU 1 recognizes the white lines on the left and right sides of the own vehicle, the white lines on both the left and right sides are displayed on the display 6 provided in front of the driver's seat as a solid filled figure. With this, the driver can instinctively grasp that the white-line recognizing means provided in the own vehicle recognizes both the white lines on the both sides.

When the lane deviation determining ECU 1 does not recognize one of or both of the left and right white lines, the white line on the display 6 which is not recognized is displayed in a hollow manner, and the contour line is displayed with a dotted line. Therefore, the driver can instinctively grasp that the white-line recognizing means provided in the own vehicle does not recognize the white line which is displayed on the display 6 as an outline figure. Thus, the driver can easily understand that a waning of lane deviation is not given in a direction where the white line is not recognized, the driver does not misjudge that the warning of lane deviation should be given, and the driver can normally drive the own vehicle.

Also when the own vehicle is running on a road surface on which no white line exists, there is no substantial difference between the display contents of the white line on the display 6 and the actual road surface, a driver does not feel a sense of discomfort.

When the own vehicle deviates from the lane, a white line which the own vehicle violates has a smaller inclination with respect to the vertical direction of the white line as compared with a normal screen, the displayed width (displayed thickness becomes relatively thicker), the displayed length is increased, the lower end position is shifted downward of the screen, and the white line is represented with a warning color such as yellow and orange as a solid filled figure, and a white line from which the own vehicle does not deviate has a larger inclination with respect to the vertical direction of the white line as compared with a normal screen, the displayed width (displayed thickness) becomes relatively thin, the displayed length becomes short, and the lower end position is shifted upward of the screen. Therefore, a driver can have perspective between a white line from which the own vehicle deviates and a white line from which the own vehicle does not deviate, and the screen is close to an actual scenery from a view point of the driver when the own vehicle deviates from the lane. Thus, the driver can sensuously recognize as to which side the own vehicle deviates (to which one of left and right sides the own vehicle deviates the lane) from the screen of the display 6. Further, since the white line from which the own vehicle deviates is colored with the warning color such as yellow and orange, the driver can more reliably recognize the deviation of the own vehicle.

OTHER EXAMPLES

Although the embodiment of the present invention has been explained above, the invention is not limited to the embodiment, and the invention can variously be modified and carried out within a range not departing from the subject matter of the invention.

For example, although the lane deviation determining ECU 1 and the warning display ECU 2 are physically separated in the embodiment, the lane deviation determining ECU 1 and the warning display ECU 2 maybe provided as one ECU functioning element. The white line detector is not limited to the CCD camera 3 as in the embodiment, and any means can be used only if it can recognize a white line on a road surface on both sides of the own vehicle from a detection result such as a laser radar and a road surface marker sensor.

The left and right display screens in this embodiment are changed in the above-described points (1) to (9) as compared with the normal screen, but it is unnecessary to carry out all of the changes of the points (1) to (9), and some of them may appropriately be omitted.

On the left deviation screen and the right deviation screen, the color of the white line from which the vehicle deviates is not limited to yellow or orange, and the color may appropriately be changed.

What is claimed is:

1. A white-line display apparatus for a vehicle, comprising:
    road surface detecting means for detecting a road surface on which a vehicle travels;
    white-line recognizing means for recognizing white lines on left and right sides of a the detected road surface;
    lane-deviation determining means for determining whether or not the vehicle deviates, or is likely to deviate, from a lane defined by the white lines, based on at least a relative position between the vehicle and the white lines recognized by the white-line recognizing means;
    display means for displaying the white lines on left and right sides thereof based on a recognition result by the white-line recognizing means; and
    white-line-display changing means for changing display of the white lines by the display means based on a determination result of the lane-deviation determining means;
    wherein,
    when the lane-deviation determining means has determined that the vehicle does not deviate, or is not likely to deviate, from the lane, the white-line-display changing means represents each of the left and right white lines displayed by the display means as a figure inclined by a predetermined angle toward a center of the display means with respect to a vertical axis at a top of the display means, and
    when the lane-deviation determining means has determined that the vehicle deviates or is likely to deviate from the lane, the white-line-display changing means represents a respective one of the left and right white lines violated by the vehicle as a figure inclined by an angle smaller than the predetermined angle.

2. The white-line display apparatus for a vehicle according to claim 1, wherein when the lane-deviation determining means determines that the vehicle deviates or is not likely to deviate from the lane, the white-line-display changing means represents the other of the left and right white lines as a figure inclined by an angle larger than the predetermined angle.

3. The white-line display apparatus for a vehicle according to claim 2, wherein when the lane-deviation determining means has determined that the vehicle has deviated, or is likely to deviate, from the lane, the white-line-display changing means represents the other of the left and right white lines as a figure having a lower end that is lifted.

4. The white-line display apparatus for a vehicle according to claim 3, wherein when the lane-deviation determining means has determined that the vehicle does not deviate, or is not likely to deviate, from the lane, the white-line-display changing means represents the other of the left and right white lines as a figure having a lower end that is lifted.

5. The white-line display apparatus for a vehicle according to claim 2, wherein when the lane-deviation determining means has determined that the vehicle deviates or is likely to deviate from the lane, the white-line-display changing means represents the one of the left and right white lines, which is violated by the vehicle, as a figure having a lower end that is lowered.

6. The white-line display apparatus for a vehicle according to claim 1, wherein when the lane-deviation determining means determines that the vehicle deviates or is likely to deviate from the lane, the white-line-display changing means represents a respective one of the left and right white lines violated by the vehicle as a thickened figure.

7. The white-line display apparatus for a vehicle according to claim 1, wherein when the lane-deviation determining means has determined that the vehicle deviates or is likely to deviate from the lane, the white-line-display changing means represents the one of the left and right white lines, which is violated by the vehicle, as a figure having a lower end that is lowered.

8. The white-line display apparatus for a vehicle according to claim 1, wherein the display means represents the white line as a solid filled figure when the white-line recognizing means recognizes the white line and as an outline figure when the white-line recognizing means does not recognize the white line.

9. The white-line display apparatus for a vehicle according to claim 8, wherein the display means shows contours of the outline figure by a dotted line.

10. The white-line display apparatus for a vehicle according to claim 1, wherein the display means for displaying the white lines includes a display screen.

* * * * *